2,889,255
Patented June 2, 1959

2,889,255

15-HYDROXYLATION OF STEROIDS BY GIBBERELLA AND FUSARIUM

Herbert C. Murray, Hickory Corners, and Peter D. Meister, Kalamazoo Township, Kalamazoo County, Mich., assignors to The Upjohn Company, Kalamazoo, Mich., a corporation of Michigan No Drawing. Application August 17, 1954
Serial No. 450,526

13 Claims. (Cl. 195—51)

The present invention relates to a novel method for the introduction of oxygen into a steroid molecule, and is more particularly concerned with an aerobic fermentation process wherein fermentation and oxygenation of steroids may be accomplished by means of fungi of the genera Gibberella, and Fusarium.

It is already known to introduce oxygen into a steroid molecule particularly into the 11-position as has been described by Murray and Peterson, United States Patent 2,602,769, issued July 8, 1952. Certain species of the order Mucorales introduce oxygen in steroid molecules in positions 6, 8, and 14 in addition to the 11 position. It has now been found that fungi of the genera Gibberella and Fusarium produce oxygenation in the 15-position of steroid molecules.

It is an object of the present invention to provide a novel method for the introduction of oxygen into a steroid molecule in the 15-position. Another object of the invention is the provision of a process for the novel modification of a steroid structure by means of Gibberella and Fusarium. Other objects of the present invention will be apparent to those skilled in the art to which this invention pertains.

The 15-hydroxy group which is introduced into a steroid by the process of the present invention has the alpha stereoconfiguration. These 15-hydroxy steroids are physiologically active compounds and are valuable for the production of heretofore known physiologically active steroids. They are intermediates for the introduction of 17-hydroxyl groups in compounds devoid of the 17-hydroxy function. Dehydration by the method of Chugaev, that is treatment of the 15-hydroxy compound with sodium hydroxide and carbon disulfide, produces the corresponding xanthogenic acid which is esterified with methyl iodide and pyrolized to yield the corresponding $\Delta^{14}$-steroid. By this method 15-hydroxy-11-desoxycorticosterone 21-monoacetate (Example 1) can be dehydrated to give known 21-acetoxy-4,14-pregnadiene-3,20-dione [K. Meyer and T. Reichstein, Helv. Chim. Acta, 30, 1508 (1947)]. A thus-produced 14-double bond can be used further for the introduction of a 14β-hydroxy group commonly present in the cardiac aglycones of the digitalis group (cf. Fieser and Fieser, Natural Products Related to Phenanthrene, third edition, Reinhold Publishing Corp., New York 18, New York, chapter 7 and pages 662–663). By bromination of the 14-double bond with N-bromosuccinimide (allylic bromination), etherification and hydrogenolysis, there are produced 16-hydroxy steroids [Hirschmann et al., J. Am. Chem. Soc. 74, 539 (1952); ibid. 75, 4862 (1953)] such as, for example, physiologically active 16-hydroxy-desoxycorticosterone diacetate [Inhoffen et al., Chem. Ber. 87, 593 (1954)]. For this purpose 15-hydroxy-21-acetoxypregnane-3,20-dione, either available (Example 19) or produced by hydrogenation of 15α-hydroxy-11-desoxycorticosterone 21-monoacetate (Example 1), is dehydrated by the method of Chugaev to give known 15-hydroxy-21-acetoxy-14-pregnene-3,20-dione (K. Meyer and T. Reichstein, loc. cit.) which upon bromination with bromosuccinimide brominates in the 16-position to give 16-bromo-21-acetoxy-14-pregnene-3,20-dione. The thus obtained bromo-compound is then treated with benzyl alcohol and potassium hydroxide to give the corresponding 16-benzyl ether [cf. Hirschmann et al., J. Am. Chem. Soc. 75, 4862 (1953)] which is hydrogenated in 95 percent ethanol with palladium on charcoal to give the corresponding 16α-hydroxy-21-acetoxy-pregnane-3,20-dione. Esterification with acetic anhydride in pyridine yields 16,21-diacetoxypregnane-3,20-dione into which the $\Delta^{4,5}$-double bond is introduced in the usual manner, that is, bromination in the 4-position, semicarbazone formation of the 3-keto group and treatment with pyruvic acid (method of Kendall and Mattox) to give the known 16α-hydroxydesoxycorticosterone diacetate. Alternatively dehydration of 15-hydroxy steroids by ionic elimination of water with methanolic hydrochloric acid, phosphorus oxychloride and the like results in the production of a 16,17-double bond useful to introduce the well-known 17-hydroxy function by the method of Julian, J. Am. Chem. Soc. 72, 5145 (1950). For example, Compound S may be prepared by producing the 15-hydroxy pregnenolone 3-monoacetate obtained by selective acetylation of 15-hydroxy pregnenolone, and dehydrating the compound with phosphorus oxychloride which simultaneously produces rearrangement to give 16-dehydropregnenolone acetate, which was converted by Julian (loc. cit.) into Compound S by dehydration of 15-hydroxy-11-desoxycorticosterone to give the 16-dehydro-11-desoxycorticosterone, which is then epoxidized to give the 16,17-oxido-11-desoxycorticosterone followed by treatment with lithium aluminum hydride to yield Reichstein's Compound S. In an analogous manner, from the 15-hydroxy derivatives of progesterone, pregnane-3,20-dione, pregnane-3,11,20-trione, 3α- and 3β-hydroxypregnane-20-one, 3α,11α- and 3β,11α-dihydroxypregnane-20-one, the corresponding 14-, 16- or 17-hydroxylated derivatives can be prepared. From the 15-hydroxylated androstane derivatives such as 15-hydroxytestosterone, 15-hydroxy-4-androstene-3,17-dione, 15-hydroxyandrostane-3,17-dione, 3α,15- and 3β,15-dihydroxyandrostane-17-one and from 3α,15,17β- and 3β,15,17β-trihydroxyandrostanes the corresponding 14- or 16-hydroxylated derivatives may be obtained.

The method of the present invention in its broader aspects, consists in fermenting a steroid by means of a species of fungus selected from the group consisting of Gibberella and Fusarium, to introduce an oxygen atom in the 15-position of the steroid. Other positions as well as the 15-position of the steroid molecule may undergo transformation due to the action of the fungus, but such transformation is not to be regarded as undesirable, since the introduction of oxygen into another position of the steroid molecule may result in valuable therapeutic products or intermediates.

The steroids operative in the method of the present invention are not limited as to type or number of substituents and for operativeness in the process need only contain an unoxygenated 15-position, illustratively a methylene group. Such compounds contain the nucleus:

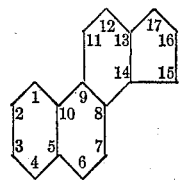

which may in addition contain substituents or combinations of substituents about the nucleus as in the 1, 2, 3, 4, 5, 6, 7, 8, 9, 10, 11, 12, 13, 14, 16 and 17 positions, especially 10,13-dimethyl groups 3, 6, 7, 11 or 12 keto groups, hydroxy or acyloxy groups; 17-side chains of which the progesterone, corticosterone (Ketol) side chains deserve special mention; a 17-keto or a 17-hydroxy group and the like; as well as double bonds in the 4, 5, 7, 6, 8, 9(11), 11(12), 16(17) and other positions or combinations of position about the nucleus; or double bonds saturated by addition thereto of halogen or hydrogen halides; adducts of dienolphenyl such as maleic acid, maleic hydride or maleic acid esters with steroids having a conjugated double bond system as at 5,7; and other substituents and combinations of substituents, double bonds and so forth too numerous for special mention, a great many of which are known in the steroid art.

Representative steroids which may be fermented by the method of the invention to produce a corresponding 15-hydroxy steroid include, progesterone, 9(11) or 11(12) - dehyroprogesterone, 7,9(11) - bisdehydroprogesterone, 17 - hydroxyprogesterone, 17α-progesterone, testosterone, pregnenolones, 3-hydroxy-5-pregnen-20-one, pregnenolone, 3β-hydroxy-5,16-pregnadiene-20-one, acyloxy-pregnenolones such as pregnenolone acetate, 3-hydroxy-5,6-oxidopregnane-20-one (α- or β-oxido), 3-hydroxy - 5-chloropregnane - 20-one, 5,6-oxidopregnane-3,20-dione (α- or β-oxido), 4-bromo and 4-chloropregnane-3,20-dione, 5-chloropregnane-3,20-dione, 3-ketopregnane-20-ol, 3-ketoallopregnane-20-ol, 3β-hydroxy-16,17 - oxido-21-acetoxy-5-pregnene-20-one, 3β-hydroxy-16,17 - oxido - 5-pregnene-20-one, 3β-hydroxy-5,6,21-tribromo - 16,17 - oxidopregnane - 20 - one, 3β-hydroxy-16-bromo - 17 - hydroxy-5-pregnene-20-one, 3β-hydroxy-16-chloro-17-hydroxy-5-pregnene-20-one, 3β-hydroxy-5(6), 16(17) - dioxidopregnane - 20 - one, 3β - hydroxy - 5(6), 16(17)-dioxido-21-bromo-pregnane-20-one, 3β-hydroxy-5(6),16(17)-dioxido-21-acetoxypregnane-20-one, 3β-hydroxy - 5(6),16(17) - dioxido - 21 - hydroxypregnane - 20-one, 11-desoxycorticosterone, delta-9(11) or 11(12)-desoxycorticosterone, 11-desoxy-17-hydroxycorticosterone and acyloxy derivatives, such as the acetoxy derivatives, thereof, 21-hydroxy-pregnenolone and 21-acyl, e.g., acetyl, esters thereof, 17,21-dihydroxypregnenolone and 17,21-diacyloxy derivatives thereof, e.g. the diacetoxy derivative, androstenedione, androstan-17-ol, 9(11) or 11(12)-dehydroandrostenedione, 3-hydroxy-9(11) or 11(12) - pregnene - 20-ones, 3,21-dihydroxy-9(11) or 11(12)-pregnen-20-ones, 3,17,21-trihydroxy-9(11) or 11(12)-pregnen-20-ones, 4-androsten-3-ol-17- one and 3-acyl, e.g. acetyl, esters thereof, 5-androsten-3-ol-17-one and 3-acyl, e.g. acetyl, esters therof; ergosterol, stigmasterol, stigmastanol, and 3-acyl, e.g. acetyl, esters of the foregoing; ergostenone, stigmastenone, stigmastanone, cholestenone, cholic acid, desoxycholic acid, lithocholic acid, cholanic acid, norcholanic acid, bisnorcholanic acid, cholenic acid, norcholenic acid, bisnorcholenic acid, and 3-hydroxy-, 3-keto-, 3,7-dihydroxy-, 3,7-diketo-, 3,7,12-trihydroxy-, 3,7,12-triketo-, 9(11) or 11(12)-unsaturated, ester, thiolester and further derivatives of the foregoing acids, and the like. Suitably a steroid having up to and including 22 carbon atoms in the carbon to carbon skeleton or a steroid having a two carbon atom side chain at the 17-position and a 15-methylene group may be used. The 10-nor-methyl, the 13-nor-methyl, and the 10,13-bisnor-methyl forms of each of the above steroids, in which either one or both of the 18 and 19 position angular methyl groups are replaced by hydrogen, are included within the purview of those steroids which may be fermented by the method of this invention.

In the process of the present invention, the operational conditions and reaction procedure and details may be those already known in the art of steroid bioconversion, utilizing however the action of a species of fungus of the genera Gibberella and Fusarium. The genus Gibberella belongs to the family Nectriaceae of the order Hypocreales of the class Ascomyceteae. The genus Fusarium belongs to the family Tuberculariaceae, order Moniliales of the class Deuteromyces. Certain species of Fusarium are the so-called imperfect or asexual form of Gibberella. Many species of fungi of the genera Gibberella and Fusarium are on file at the American Type Culture Collection (ATCC) and Centraalbureau voor Schimmelcultures Baarn (C.B.S.). The latter cultures are identified by name and not by number. The classification as herein employed is that of Bessey, Morphology, and Taxonomy of Fungi, the Blakiston Company, Philadelphia, 1950. Among the Gibberella genus of which some Fusaria are probably the imperfect asexual forms the following species were found to be particularly useful in the fermentation and oxygenation of the instant application: *Gibberella zeae* (ATCC 10,910), *Gibberella saubinetii*, *Gibberella cyanea*, *Gibberella fujikuroi*, *Gibberella baccata*. Among the species of the genus Fusarium useful in the fermentation and oxygenation of steroids may be mentioned *Fusarium oxysporium* (ATCC 9991), *Fusarium lini* (ATCC 9593), *Fusarium moniliforme* (ATCC 10,052), *Fusarium udum* (ATCC 10,084), *Fusarium orthoceras* (ATCC 10,082), *Fusarium sulphureum* (ATCC 7642), *Fusarium avenaceum* (ATCC 8150), *Fusarium vasinfectum* (ATCC 7808), *Fusarium oxysporium* f. *cepae* (ATCC 11,711), *Fusarium concolor*, *Fusarium bulbigeuum*, *Fusarium conglutinans*, *Fusarium caeruleum*, *Fusarium solani*, and *Fusarium caucasius*.

Culture of the fungi, for the purpose and practice of the present invention, is in or on a medium favorable to the development of the fungi. Solid media may be utilized, but the preferred media are those which permit quantity growth under aerobic conditions. Moist solid particulate media, such as bran, cereal grains, cereal grits, wood chips, shavings, sawdust, cornhusks, fibrous material, such as copra, chestnuts, or lupine seeds may be used. These can be extracted with alcohol, ether or other organic solvents, to remove objectionable contaminants and growth inhibitors prior to fermentation. The carriers may optionally contain added growth factors and nutrients and may be used in layers or trays with or without auxiliary aeration, in towers as in the vinegar process or under conditions of agitation as for example by tumbling in a rotating drum. Liquid media, illustratively brewer's wort, are well adapted to use under aerobic layer or more especially aerobic submerged fermentation conditions. Suitably the media should contain sources of available carbon, nitrogen and minerals although of course there can be significant growth and development under less than optimum conditions.

Available carbon may be from carbohydrates, starches, gelatinized starches, dextrin, sugars, molasses as of cane, beet and sorghum, glucose, fructose, mannose, galactose, maltose, sucrose, lactose, pentoses, amino acids, peptones or proteins, the hexoses being preferred. Lower fatty acids, higher fatty acids, or fats are illustrative of other materials which provide assimilable carbon for the energy requirements of the fungi. Mixtures of various carbon sources are sometimes advantageous.

Nitrogen in assimilable form may be provided by soluble or insoluble vegetable or animal proteins, soybean meal, lactalbumin, casein, egg albumin, peptones, polypeptides, amino acids, acid amides, urea, ammonium salts, ammonia trapped on base exchange resins or on zeolites, ammonium chloride, nitrates, sodium nitrate, potassium nitrate, or morpholine. Whey, distillers' solubles, corn steep liquor, or yeast extract have been useful.

As mineral constituents the media or menstruum may contain, naturally present or added, available aluminum, calcium, chromium, cobalt, copper, gallium, iron, magnesium, molybdenum, potassium, scandium, uranium, and vanadium. Sulfur may be provided by sulfates, alkyl sulfonates, sulfoxylates, sulfamates, sulfinates, free sulfur, hyposulfite, persulfate, thiosulfate, methionine, cystine, cystein, thiamin or biotin. Phosphorus, preferably pentavalent, suitably in a concentration at or about 0.001 to 0.07 molar and particularly at or about 0.015 to 0.02, may be present, suitably as ortho-, meta-, or pyrophosphates, salts or esters, phytin, phytic acid, phytates, glycerophosphate, sodium nucleinate, and/or corn steep liquor, casein, lecithin or ovovitellin. Boron, iodine and selenium in traces may be advantageous. Desirably boron, in the form of boric acid or sodium borate may be present or added especially after germination and early growth of the fungus.

Other accessory growth factors, vitamins, auxins and growth stimulants may be provided as needed or desired.

While solid or liquid media may be utilized, a liquid medium is preferred as it favors mycelial growth.

Suspending or mycelial carriers such as filter earths, filter aids, finely divided cellulose, wood chips, bentonite, calcium carbonate, magnesium carbonate, charcoal, activated carbon or other suspendable solid matter, methyl cellulose, carboxymethyl cellulose, alginates or polyvinyl alcohol may be added to facilitate fermentation, aeration and filtration.

The selected species of fungus is grown on a medium suitably containing assimilable non-steroidal carbon, illustratively carbohydrates, such as dextrose; assimilable nitrogen, illustratively soluble or insoluble proteins, peptones or amino acids; and mineral constituents, illustratively phosphate and magnesium sulfate. The medium may desirably have a pH before inoculation of between about four to about seven though a higher or lower pH may be used. A pH of between about five and about six is preferred for the growth of Gibberella or Fusarium. Inoculation of the fungi growth-supporting medium with the selected fungus of Gibberella or Fusarium may be accomplished in any suitable manner. Gibberella and Fusarium grow over a range from about 20 to about 38 degrees centigrade with a temperature between about 20 to about 35 degrees centigrade preferred.

The developmental period of fungal growth required before the steroid to be fermented is exposed to the fungus does not appear to be critical, for example, the steroid may be added either before thermal or other sterilization of the medium, at the time of inoculating the medium with a selected Gibberella or Fusarium species, or at sometime, for example, 24 or 48 hours later. The steroid to be fermented may be added at any suitable concentration although for practical reasons steroid substrate at a concentration of about or up to about 0.5 gram per liter or even 0.8 gram per liter of medium is satisfactory and two grams per liter is operative although higher concentration, depending on the particular steroid, may be used. The addition of steroid substrate to be fermented may be accomplished in any suitable manner especially so as to promote a large surface of contact of the steroid substrate with the fungus, such as dispersing the steroid substrate, either alone or with a dispersing agent, or in solution in an organic solvent by mixing or homogenizing a steroid substrate with a fungal medium to form a suspension or dispersion of the steroid. Either submerged or surface culture procedures may be used with facility, although submerged culture is preferred. Alternatively, steroid fermenting enzymes of a growth of the fungus may be separated from the fungus or medium, admixed with the steroid or a solution or dispersion thereof, and the mixture subjected to aerobic conditions to accomplish fermentation of the steroid.

The temperature during the period of fermentation of the steroid may be the same as that found suitable for fungal growth. It need be maintained only within such range as supports life, active growth, or the enzyme activity of the fungus.

While any form of aerobic incubation is satisfactory for the growth of the selected fungus and fermentation of the steroid substrate, the efficiency of steroid fermentation is related to aeration and agitation. Therefore, aeration is usually controlled, as by agitation and/or blowing air through the fermentation medium. Aeration may be effected by surface culture or under submerged fermentation conditions. Aerobic conditions include not only the use of air to introduce oxygen, but also other sources or mixtures containing oxygen in free or liberatable form. In using air as the aerating medium, a desirable rate of aeration is about four to twenty millimoles and particularly about twelve to twenty millimoles of oxygen per hour per liter as determined by the method of Cooper, Fernstrom and Miller, Ind. Eng. Chem. 36, 504 (1944). Aeration is suitably modified by using superatmospheric or subatmospheric pressures, for example, thirty pounds per square inch or ten pounds per square inch absolute. Oxygen uptake may be facilitated by the presence of various agents such as ascorbic acid, glutamic acid, citric acid, lactic acid, tyrosine, or tryptophane.

The time required for the fermentation of steroid varies somewhat with the procedure. When the steroid substrate is present at the time of inoculation of the medium, periods of from eight to 72 hours may be used. However, when the steroid is added to the fungus, after substantial aerobic growth of the fungal organism, for example, after sixteen to 24 hours at optimum temperature, the conversion of steroid substrate begins immediately and high yields are obtained in from one to 72 hours, 24 hours being generally satisfactory.

After completion of the steroid fermentation, the resulting fermented steroid is recovered from the fermentation reaction mixture. An especially advantageous manner of recovering the fermented streoid involves extracting the fermentation reaction mixture, including the fermentation liquor and mycelia with a water-immiscible organic solvent for steroids, for example, methylene chloride, chloroform, carbon tetrachloride, ethylene chloride, trichloroethylene, ether, amyl acetate, benzene, and the like. The fermentation liquor and mycelium may be separated and then separately extracted with suitable solvents. Mycelium may be extracted with either water-miscible or water-immiscible solvents, acetone being effective. The fermentation liquor, freed of mycelia may be extracted with water-immiscible solvents. The extracts can be combined, either before or after washing with an alkaline solution, illustratively sodium bicarbonate, suitably dried, as for example, over anhydrous sodium sulfate, and the purified fermented steroid obtained by recrystallization from organic solvents, by trituration or by chromatography in order to isolate the thus obtained 15-hydroxy streoids from the other fermentation products.

The following examples are illustrative of the process of the present invention and are not to be construed as limiting.

EXAMPLE 1

*15,21-dihydroxy-4-pregnene-3,20-dione*

A medium was prepared of 10 grams of Cerelose dextrose, 20 grams of corn steep liquor, and 1000 milliliters of water, surface or subterranean, and adjusted to a pH between 5.6 and 5.8. Twelve liters of this sterilized medium was inoculated with spores of *Fusarium oxysporium* (American Type Culture Collection 9991) and incubated for a period of 24 hours at a temperature of 26 degrees centigrade, using a rate of aeration and stirring such that the oxygen uptake was 13 millimoles per hour per liter of $Na_2SO_3$, according to the method of Cooper, Fernstrom and Miller, Ind. Eng. Chem. 36, 504 (1944). To this medium containing a 24-hour growth of *Fusarium oxysporium* was added three grams of 11-desoxy-corticosterone (21-hydroxy-4-pregnene-3,20-dione), dissolved in 200 milliters of acetone. After an additional 24-hour period of incubation under the same conditions of temperature and aeration, the beer and mycelium were separated. The mycelium was filtered, washed twice, each time with a volume of acetone approximately equal to the volume of the mycelium, and extracted twice each time with a volume of methylene chloride approximately equal to the volume of the mycelium. The acetone and methylene chloride extracts including solvent were added to the beer filtrate. The combined extracts and beer filtrate were extracted successively with two one-half volume portions of methylene chloride and then with two one-fourth volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering the solvent was distilled from the filtrate. The residue thus obtained was 6.7 grams of an oily liquid which, upon trituration with a mixture of acetone and ether in a one to one ratio, crystallized. Five triturations of this crystalline material with ether, each time followed by decantation of the ethereal mothers liquors gave 2.55 grams to 15,21-dihydroxy-4-pregnene-3,20-dione of melting point 222 to 227 degrees centigrade, $$\lambda_{max}^{alc} \ 242 \ m\mu$$

E=16,800; $[\alpha]_D$ +212 degrees concentration of 0.9 in chloroform.

*Analysis.*—Calculated for $C_{21}H_{30}O_4$: C, 72.80; H, 8.73. Found: C, 72.99; H, 8.47.

This compound inhibits yeast, fungi and bacteria especially *Staphylococcus aureus*.

Acetylation of 15,21-dihydroxy-4-pregnene-3,20-dione with an excess of acetic anhydride in pyridine solution at room temperature gave 15,21-diacetoxy-4-pregnene-3,20-dione, melting point 165 to 167 degrees, while acetylation of the same material with the calculated amount of acetic anhydride in pyridine gave the monoacetate, 15-hydroxy-21-acetoxy-4-pregnene-3,20-dione of melting point 139 to 140 degrees.

EXAMPLE 2

*15-hydroxyprogesterone*

A medium was prepared of 20 grams of Edamine enzymatic digest of lactalbumin, three grams of cornsteep liquor and fifty grams of technical dextrose diluted to one liter with tap water and adjusted to a pH of 5.85. Twelve liters of this sterilized medium was inoculated with *Fusarium lini* (ATCC 9593), incubated for 48 hours at a temperature of 26 degrees centigrade using a rate of aeration and stirring as in Example 1. Incubation under the same time and conditions of temperature and aeration, extraction and purification as shown in Example 1 yielded pure 15-hydroxyprogesterone of melting point 230 to 234 degrees centigrade; $[\alpha]_D^{21}$ +224 degrees; (C, 1.0 in chlorofrom);

$$\lambda_{max}^{alc} \ 242 \ m\mu; \ E=16,400$$

*Analysis.*—Calculated for $C_{21}H_{20}O_3$: C, 76.32; H, 9.15. Found: C, 76.79; H, 9.49.

15-hydroxyprogesterone has adrenal involution activity.

EXAMPLE 3

*15-hydroxytestosterone*

Using *Fusarium udum* (American Type Culture Collection No. 10,084), and testosterone as a starting steroid the fermentation and isolation being as described in Example 1, produced 15-hydroxytestosterone having a melting point of 199 to 201 degrees centigrade $[\alpha]_D$ +153 (C, 0.9 in chloroform);

$$\lambda_{max}^{alc} \ 242 \ m\mu; \ E=15,400$$

*Analysis.*—Calculated for $C_{19}H_{28}O_3$: C, 74.96; H, 9.27. Found: C, 74.55; H, 9.08.

15-hydroxytestosterone demonstrates anabolic, anti-hypertensive, anti-bacterial and anti-fungal activity.

EXAMPLE 4

*15-hydroxypregnenolone*

In the same manner as given in Example 1 using *Fusarium oxysporium* f. *cepae* (ATCC 11,711) and pregnenolone as a starting steroid produced 15-hydroxypregnenolone.

Acetylation of 15-hydroxypregnenolone with excess of acetic anhydride in pyridine produced the diacetate of 15-hydroxypregnenolone, while acetylation of 15-hydroxypregnenolone with the calculated amount of acetic anhydride in pyridine at room temperature produced a mixture from which the 3-monoacetate of 15-hydroxypregnenolone was separated by chromatography.

EXAMPLE 5

*15-hydroxypregnane-3,11,20-trione*

In the same manner as given in Example 1 using *Fusarium vasinfectum* (ATCC 7808) and pregnane-3,11,20-trione as the starting steroid produced 15-hydroxypregnane-3,11,20-trione.

EXAMPLE 6

*15-hydroxyallopregnane-3,20-dione*

In the same manner as given in Example 2 using *Fusarium sulphureum* (ATCC 7642) and allopregnane-3,20-dione produced 15-hydroxyallopregnane-3,20-dione.

EXAMPLE 7

*15-hydroxy-4-androstene-3,17-dione*

In the same manner as given in Example 1 using *Fusarium oxysporium* and 4-androstene-3,17-dione as a starting steroid produced 15-hydroxy-4-androstene-3,17-dione.

EXAMPLE 8

*15-hydroxy-3-keto-bisnor-4-cholen-22-al*

In the same manner as given in Example 1 using *Fusarium solani* (C.B.S.) and 3-keto-bisnor-4-cholen-22-al as a starting steroid produced 15-hydroxy-3-keto-bisnor-4-cholen-22-al.

EXAMPLE 9

*15-hydroxy-10-normethyltestosterone*

In the same manner as given in Example 1 using *Fusarium orthoceras* (ATCC 10,082) and 10-normethyltestosterone (nortestosterone) as a starting material produced 15-hydroxy-10-normethyltestosterone.

EXAMPLE 10

*15-hydroxycorticosterone*

In the same manner as given in Example 1, using *Fusarium moniliforme* (ATCC 10,052) and corticosterone as a starting steroid produced 15-hydroxycorticosterone.

EXAMPLE 11

*Fermentation of 11-desoxycorticosterone with Gibberella*

In the same manner as given in Example 1, but using *Gibberella zeae* (ATCC 10,910) produced 15-hydroxy-11-desoxycorticosterone (15,21-dihydroxy-4-pregnene-3,20-dione) which was similarly obtained by fermenting 11-desoxycorticosterone with *Gibberella saubinetii, Gibberella cyanea, Gibberella fujikuroi* or *Gibberella baccata.*

EXAMPLE 12

*15-hydroxy-11-ketoprogesterone*

In the same manner as given in Example 1, using Fusarium concolor (C.B.S.) and 11-ketoprogesterone as a starting material produced 15-hydroxy-11-ketoprogesterone.

EXAMPLE 13

15-hydroxycortisone

In the same manner as given in Example 2, using *Fusarium oxysporium* and cortisone acetate as starting material produced 15-hydroxycortisone.

EXAMPLE 14

6β,15-dihydroxyprogresterone

In the same manner as given in Example 1, using *Fusarium oxysporium* and 6β-hydroxyprogesterone as starting material produced 6β,15-dihydroxyprogesterone.

EXAMPLE 15

11α,15-dihydroxyprogesterone

In the same manner as given in Example 2, using *Gibberella zeae* (ATCC 10,910) and 11α-hydroxyprogesterone as starting material produced 11α,15-dihydroxyprogesterone.

EXAMPLE 16

15-hydroxy-9(11)-dehydroprogresterone

In the same manner as given in Example 1, using *Gibberella saubinetii* (C.B.S.) and 9(11)-dehydroprogesterone as a starting material produced 15-hydroxy-9(11)-dehydroprogesterone.

EXAMPLE 17

15-hydroxystigmasterol

In the same manner as given in Example 1, using *Gibberella cyanea* (C.B.S.) and stigmasterol produced 15-hydroxystigmasterol.

EXAMPLE 18

15-hydroxy-5,6-oxidopregnane-3,20-dione

In the same manner as given in Example 2, using *Fusarium moniliforme* (ATCC 10,052) and 5(6)-oxidopregnane-3,20-dione as starting material produced 15-hydroxy-5,6-oxidopregnane-3,20-dione.

EXAMPLE 19

15,21-dihydroxypregnane-3,20-dione

In the same manner as given in Example 1, using *Fusarium oxysporium* and 21-acetoxypregnane-3,20-dione as starting material produced 15,21-dihydroxypregnane-3,20-dione.

Acetylation with the calculated amount of acetic anhydride in pyridine, produces 15-hydroxy-21-acetoxypregnane-3,20-dione.

In the same manner as shown in the preceding examples other steroids possessing a cyclopentanopolyhydrophenanthrene nucleus with a 15-methylene group can be oxygenated in the 15-carbon atom by the use of fungi of the genus Gibberella or the so-called imperfect form Fusarium. Representative 15-hydroxylated steroids thus prepared from available, corresponding 15-desoxy steroids include: 11β,15-dihydroxyprogesterone, 11β,15,17α,21-tetrahydroxy-4-pregnene-3,20-dione (from Reichstein's Compound S) 15-hydroxypregnane-3,12,20-trione, 15-hydroxyallopregnane-3,6,20-trione, 8,15,17α,21-tetrahydroxy-4-pregnene-3,20-dione (from 8,17α,21-trihydroxy-4-pregnene-3,20-dione U.S. Patent 2,660,587) 8,15-dihydroxy-4-androstene-3,17-dione (from 8-hydroxy-4-androstene-3,17-dione, U.S. Patent 2,660,587) 15-hydroxy-4-bromopregnane-3,20-dione, 15-hydroxy-5-chloropregnane-3,20-dione and the like.

The process of the present invention produces compounds having physiological activity per se as well as being useful as emulsifying agents or to increase the solubility of other known physiologically active steroids.

It is to be understood that the invention is not to be limited to the exact details of operation or exact compounds shown and described as obvious modifications and equivalents will be apparent to one skilled in the art and the invention is only to be limited to the scope of the appended claims.

We claim:

1. A process of fifteen-hydroxylating a steroid which comprises: growing a species of fungus from the group consisting of the genera Gibberella and Fusarium under aerobic conditions in the presence of a fermentation medium containing assimilable non-steroidal carbon and a steroid having a fifteen methylene group and up to and including 29 carbon atoms in the carbon to carbon skeleton and recovering the resulting fifteen-hydroxylated steroid.

2. A process of fifteen-hydroxylating a steroid which comprises: growing a species of Gibberella under submerged aerobic conditions in a fermentation medium containing assimilable non-steroidal carbon and a steroid having a fifteen methylene group and up to and including 29 carbon atoms in the carbon to carbon skeleton and isolating the resulting fifteen-hydroxylated steroid.

3. A process of fifteen-hydroxylating a steroid which comprises: growing a species of Fusarium under submerged aerobic conditions in a fermentation medium containing assimilable non-steroidal carbon and a steroid having a fifteen methylene group and up to and including 29 carbon atoms in the carbon to carbon skeleton and isolating the resulting fifteen-hydroxylated steroid.

4. A process of fifteen-hydroxylating a steroid which comprises: growing a species of Fusarium under submerged aerobic conditions in a fermentation medium containing carbohydrate and a steroid having a fifteen methylene group and up to and including 29 carbon atoms in the carbon to carbon skeleton, and isolating the resulting fifteen-hydroxylated steroid.

5. A process of fifteen-hydroxylating a steroid which comprises: growing a Gibberella under aerobic submerged agitated conditions in a fermentation medium containing assimilable non-steroidal carbon and a steroid substrate, consisting essentially of steroid having a fifteen methylene group and up to and including 29 carbon atoms in the carbon to carbon skeleton, and isolating the resulting fifteen-hydroxylated steroid.

6. A process comprising growing a species of fungus of the genus Gibberella under aerobic agitated conditions in a nutrient fermentation medium containing a steroid substrate, consisting essentially of a steroid having a fifteen methylene group and up to and including 22 carbon atoms in the carbon to carbon skeleton and isolating the resulting fifteen-hydroxylated steroid.

7. A process comprising growing a species of fungus of the genus Fusarium under aerobic agitated conditions in a nutrient fermentation medium containing a steroid substrate, consisting essentially of a steroid having a fifteen methylene group and up to and including 22 carbon atoms in the carbon to carbon skeleton and isolating the resulting fifteen-hydroxylated steroid.

8. A process of producing fifteen-hydroxylated steroid comprising: growing a Gibberella under aerobic conditions in a nutrient fermentation medium containing a steroid selected from the group consisting of progesterone, 21-hydroxy-4-pregnene-3,20-dione, 17α,21-dihydroxy-4-pregnene-3,20-dione, and testosterone, and isolating the resulting fifteen-hydroxylated steroid.

9. A process of producing fifteen-hydroxylated steroid comprising: growing a species of Fusarium under aerobic conditions in a nutrient medium containing a steroid selected from the group consisting of progesterone, 21-hydroxy-4-pregnene-3,20-dione, 17α,21-dihydroxy-4-pregnene-3,20-dione, and testosterone, and isolating the resulting fifteen-hydroxylated steroid.

10. A process of producing 15-hydroxyprogesterone comprising: growing a species of *Fusarium lini* under aerobic conditions in a nutrient fermentation medium containing progesterone and isolating the resulting 15-hydroxyprogesterone.

11. A process of producing 15,21-dihydroxy-4-pregnene-3,20-dione comprising: growing a species of *Fusarium oxysporium* under aerobic conditions in a nutrient fermentation medium containing 21-hydroxy-4-pregnene-3,20-dione and isolating the resulting 15,21-dihydroxy-4-pregnene-3,20-dione.

12. A process of producing 15,17α,21-trihydroxy-4-pregnene-3,20-dione comprising: growing a species of *Fusarium oxysporium* under aerobic conditions in a nutrient fermentation medium containing 17α,21-dihydroxy-4-pregnene-3,20-dione and isolating the resulting 15,17α,21-trihydroxy-4-pregnene-3,20 dione.

13. A process of producing 15-hydroxytestosterone comprising: growing a species of *Fusarium udum* under aerobic conditions in a nutrient fermentation medium containing testosterone and isolating the resulting 15-hydroxytestosterone.

References Cited in the file of this patent

UNITED STATES PATENTS

| | | |
|---|---|---|
| 2,649,400 | Murray et al. | Aug. 18, 1953 |
| 2,649,402 | Murray et al. | Aug. 18, 1953 |
| 2,658,023 | Shull et al. | Nov. 3, 1953 |
| 2,753,290 | Fried et al. | July 3, 1956 |

OTHER REFERENCES

Wolf et al.: The Fungi, vol. I, 1947, Wiley, pages 334, 335, 400, 401.

Vischer et al.: Experientia, 1953, vol. 9, pages 371 to 373.

Eppstein et al.: Vitamins and Hormones, vol. XIV, 1956, pages 390–391.